May 28, 1940.  W. H. LINK  2,202,459
EXPANSIBLE HOSE NOZZLE
Filed July 8, 1939
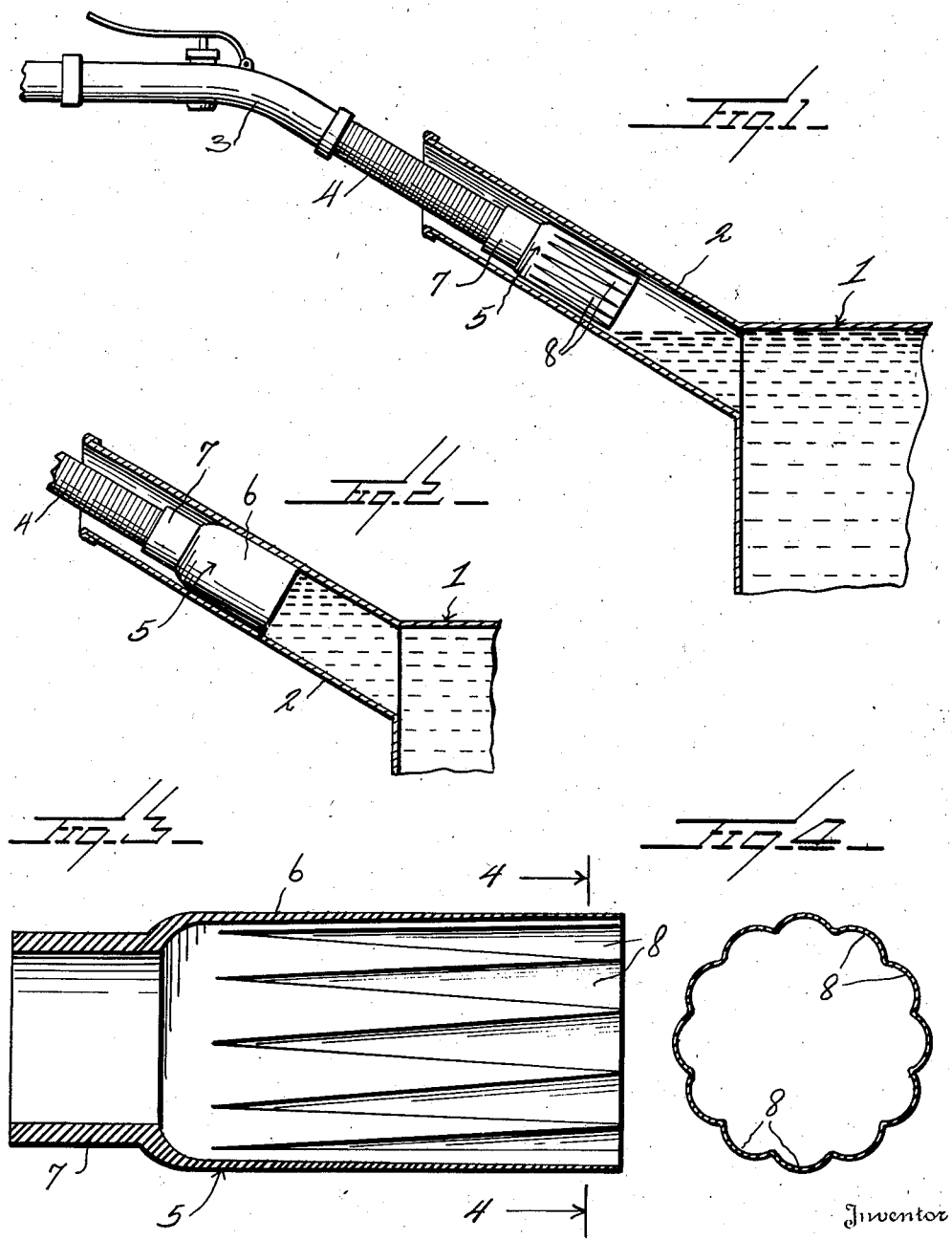
Inventor
W. H. Link
By Watson E. Coleman
Attorney Patented May 28, 1940

2,202,459

UNITED STATES PATENT OFFICE 2,202,459

EXPANSIBLE HOSE NOZZLE

William H. Link, Los Angeles, Calif., assignor of forty-nine per cent to Edward V. Jones, Los Angeles, Calif.

Application July 8, 1939, Serial No. 283,493

4 Claims. (Cl. 221—84)

This invention relates to hose nozzles and pertains particularly to an improved attachment for the nozzle of the hose of a gasoline dispenser.

In the dispensing of gasoline at service stations, it frequently occurs that the attendant will overfill the gasoline tank of the motor vehicle with the result that the gasoline backs out through the filling nozzle of the tank and is spilled over the motor vehicle and the car. This not only is detrimental to the finish of the motor vehicle and causes delay in the servicing of the car, but of more importance is the fact that it constitutes a source of danger in that the gasoline may become ignited through contact with a heated exhaust pipe or some other source of heat.

The present invention has for its primary object to provide a nozzle attachment or terminal which, when inserted into the motor vehicle tank filling nozzle, will function, when the tank becomes filled and the gasoline backs up into the filling nozzle, to close the nozzle so as to prevent the spilling of gasoline therefrom.

Another object of the invention is to provide a terminal for the nozzle of a dispensing hose, which is of a design which will not interfere with the escape of air from the gasoline tank of the vehicle as the tank is being filled, but which will immediately expand and block the filling nozzle as soon as the tank is completely filled thus avoiding the spilling of gasoline on the vehicle and the ground.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view illustrating the device embodying the present invention inserted, on the nozzle of a hose, into the filling pipe or nozzle of a gasoline tank, the latter being in section.

Fig. 2 is a view similar to Fig. 1, but showing how the expansible nozzle fills the filling pipe or nozzle of the tank when the tank becomes filled with the gasoline.

Fig. 3 is a view in longitudinal section on an enlarged scale through the hose nozzle attachment embodying the present invention.

Fig. 4 is a sectional view on the line 4—4 of Fig. 3.

Referring now more particularly to the drawing, the numeral 1 generally designates a portion of a motor vehicle gasoline tank having the filling pipe 2 through which gasoline is introduced. The number 3 designates a conventionally illustrated gasoline dispensing hose having the usual flexible nozzle or tip 4 which is introduced into the vehicle tank pipe 2.

The nozzle attachment or auxiliary nozzle for the nozzle 4 of the hose is indicated generally by the numeral 5. This auxiliary nozzle comprises a main body portion 6 and an end collar portion 7, and while the entire auxiliary nozzle is formed of rubber, the collar portion is made heavier and relatively stiff while the body portion 6 is made of soft or very flexible rubber so that it may be expanded as hereinafter described.

The wall of the body portion 6 of the auxiliary nozzle is of gradually decreasing thickness from the collar end to the opposite end as shown, and in addition the wall is provided with the flutes or corrugations 8 which extend from the end of greatest thinness through the major portion of the length of the body 6 and which are of gradually decreasing width toward the collar end, as shown in Fig. 3.

Normally the body of the auxiliary nozzle 5 is of constant circumference throughout its length or, in other words, the body is perfectly straight exteriorly so that it may be conveniently inserted into the filling pipe 2 of a gasoline tank. The body 6 is also of a diameter which is only slightly less than the interior diameter of the pipe 2 so that the pipe is substantially filled by the nozzle and as the gasoline is introduced into the tank, the air will escape from the tank between the flues or corrugations 8.

The normal condition of the auxiliary nozzle in the tank pipe 2 is as illustrated in Fig. 5, but when the pipe 2 fills up with the gasoline, the sudden resistance to the entrance of more gasoline into the pipe from the hose nozzle will create a momentary pressure within the auxiliary nozzle and this will result in the expansion of the thin portion of the auxiliary nozzle so that the flutes 8 will be flattened out and the auxiliary nozzle will become perfectly circular in cross-section and completely fill the tank nozzle 2 as shown in Fig. 2. This will result in the blocking of the tank nozzle and the resultant stoppage of the nozzle and pipe will be at once made apparent to the attendant and will enable him to shut off the flow of gasoline through the dispensing hose 3 before the auxiliary nozzle has been ejected by the fluid pressure from the tank pipe 2.

From the foregoing, it will be readily apparent that the hose nozzle attachment embodying the present invention constitutes a very desirable addition to gasoline dispensing hose as it will operate effectively to prevent loss of gasoline and also prevent accidents.

What is claimed is:

1. As an attachment for the nozzle of a fluid dispensing hose, a tubular body of flexible material formed at one end to provide a collar adapted to encircle the end of the hose nozzle and formed throughout the major portion of its length from said collar to the other end of gradually decreasing thickness, the said portion of gradually decreasing thickness being of greater softness and flexibility than the collar portion whereby an internal pressure set up in the body portion will effect an overall increase in the diameter thereof.

2. As an attachment for the nozzle of a dispensing hose, an auxiliary nozzle comprising an elongated body of rubber, said body at one end being formed to provide a collar of substantial thickness adapted to encircle the hose nozzle adjacent the end thereof, said collar being of materially less flexibility than the remaining portion of the body, the said remaining portion of the body being of gradually decreasing thickness toward the end remote from the collar and having longitudinally extending flutes formed therein, the said flutes facilitating the expansion of the tapered body portion at the end thereof remote from the collar.

3. A dispensing hose nozzle for insertion in a filling pipe of a tank, consisting of a cylindrical body of soft rubber and of greater length than diameter and having a relatively thin wall form from adjacent its outlet end to the opposite end to expand within the tank filling pipe into which it is introduced, upon the establishment of a back pressure within the tank and pipe.

4. As an attachment for the nozzle of a dispensing hose adapted for filling a receptacle having a filling pipe, a nozzle consisting of a cylindrical body of soft rubber and of greater length than diameter and of relatively thin wall form from adjacent its outlet end to the opposite end to expand within and close a filling pipe into which it is introduced, under the establishment of a back pressure in said pipe, the wall of the body being shaped to have longitudinal flutes extending from said outlet end, to facilitate diametrical expansion of the body.

WILLIAM H. LINK.